US006563703B2

(12) United States Patent
Xie (10) Patent No.: US 6,563,703 B2
(45) Date of Patent: May 13, 2003

(54) PORTABLE AND PLUGABLE THERMAL AND POWER SOLUTION FOR A NOTEBOOK OR HANDHELD DEVICE

(75) Inventor: Hong Xie, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 47 days.

(21) Appl. No.: 09/751,715

(22) Filed: Dec. 27, 2000

(65) Prior Publication Data

US 2002/0080578 A1 Jun. 27, 2002

(51) Int. Cl.$^7$ ................................................. G06F 1/16
(52) U.S. Cl. ..................... 361/687; 361/686; 361/696; 710/303; 174/15.2; 64/3.2
(58) Field of Search .................................. 361/686, 687, 361/690, 695, 696, 697, 700–704, 709; 710/303, 304; 174/15.2; 165/104.14, 104.33; 62/3.2, 3.7

(56) References Cited

U.S. PATENT DOCUMENTS

| | | | | |
|---|---|---|---|---|
| 5,704,212 A | * | 1/1998 | Erler et al. ..................... 62/3.2 |
| 5,784,253 A | * | 7/1998 | Ooka et al. .................. 361/686 |
| 5,974,556 A | * | 10/1999 | Jackson et al. ............. 713/322 |
| 5,992,155 A | * | 11/1999 | Kobayashi et al. ............ 62/3.7 |
| 6,029,215 A | * | 2/2000 | Watts, Jr. et al. ........... 710/101 |
| 6,058,009 A | * | 5/2000 | Hood, III et al. ........... 361/687 |
| 6,084,769 A | * | 7/2000 | Moore et al. ................ 361/687 |
| 6,118,654 A | * | 9/2000 | Bhatia ......................... 361/687 |
| 6,181,553 B1 | * | 1/2001 | Cipolla et al. .............. 361/687 |
| 6,276,448 B1 | * | 8/2001 | Maruno ....................... 165/185 |
| 6,353,536 B1 | * | 3/2002 | Nakamura et al. .......... 361/686 |

* cited by examiner

Primary Examiner—Darren Schuberg
Assistant Examiner—Yean Hsi Chang
(74) Attorney, Agent, or Firm—Blakley, Sokoloff, Taylor & Zafman LLP (57) ABSTRACT

An apparatus, comprising a portable module to cool, comprising a cooling device and a thermal connector.

6 Claims, 9 Drawing Sheets

PORTABLE AND PLUGABLE THERMAL AND POWER SOLUTION FOR A NOTEBOOK OR HANDHELD DEVICE

BACKGROUND OF THE INVENTION

1. Field of the Invention

This invention relates to the field of portable electronic hardware and in particular to supplementing the cooling of computers and providing additional battery power to computers, such as notebooks and handheld devices.

2. Discussion of Related Art

Computer laptops or notebooks, along with a variety of hand or palm held portable devices, require thermal management. Since the systems are size limited, the options for managing internally generated heat are more constrained over the larger stand-alone computer systems, like desktop systems. Due to component heating within the system, the air temperature will typically be higher within the portable systems as a result of the reduced physical space over that of the larger stand-alone systems. Portable systems must be able to run off a battery supply and the addition of a large and/or fast cooling fan, even if space allowed, adds a burden to the capacity of the battery. In addition, as a result of the continued addition of new components such as CD-ROM and DVD drives along with improvements in existing components such as larger displays, both to notebooks and handheld devices, the need for an additional battery power supply and better system cooling exists.

DETAILED DESCRIPTION OF THE PRESENT INVENTION

A structure and method for a portable module to provide supplemental cooling or supplemental cooling with additional power for a computer is disclosed. The computer may be in the form of a notebook computer (notebook) or a handheld computer device (handheld device). The present invention offers a portable and plugable cooling system that can include an additional power delivery system for the computer. The portable solution can be offered as a separate add-on piece, rather than built into the system, which would add to the size and weight of the notebook or handheld device. The portable power and/or cooling system could be designed to easily connect as a module to the notebook or handheld device.

Figure 1:
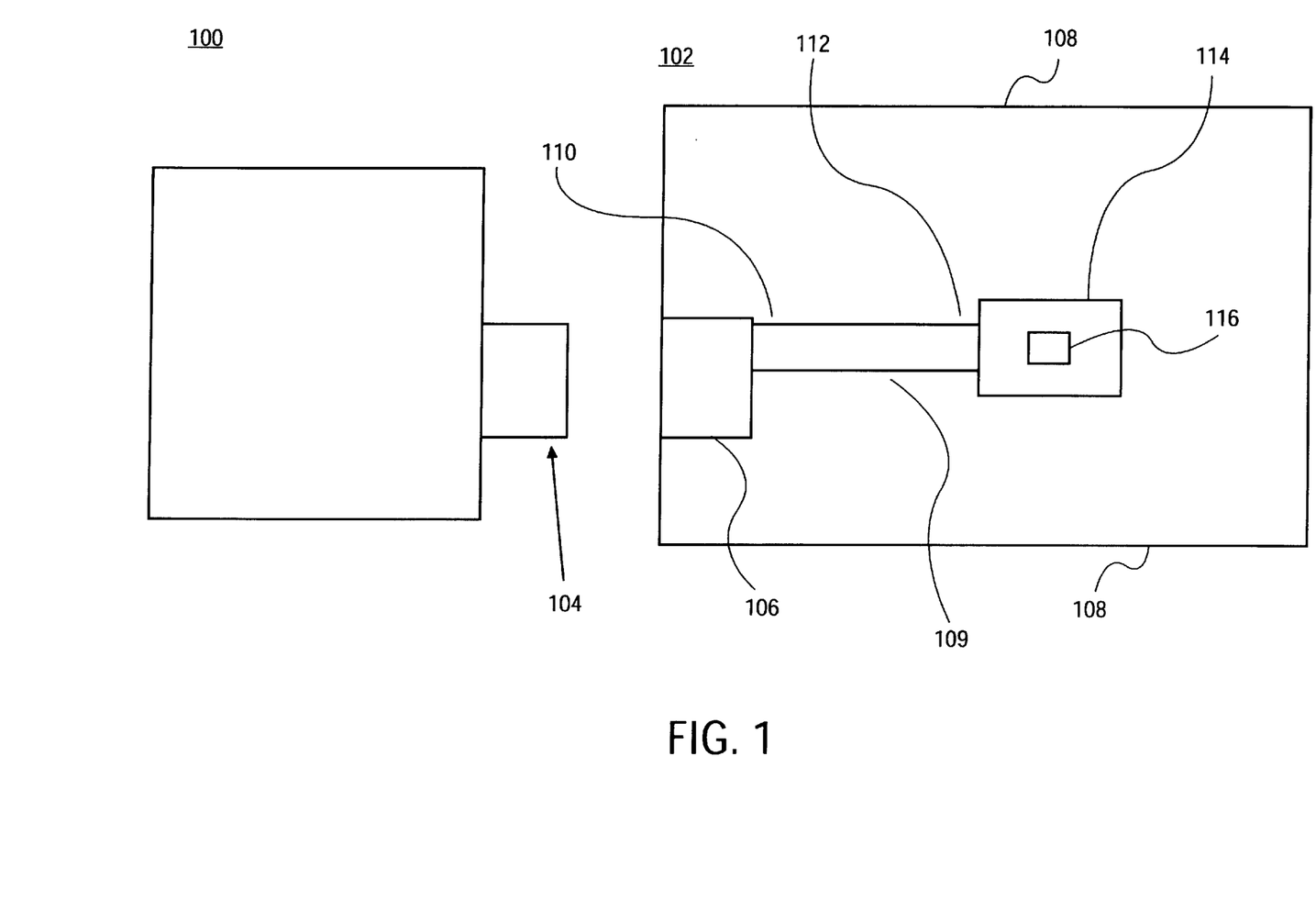
FIG. 1 is an illustration of a cross-section of a portable module beside a notebook computer.

FIG. 1 illustrates an embodiment of the present invention, a portable module (module) 100 positioned beside a notebook computer 102. The module can connect to the notebook 102 through a first thermal connector 104. The first thermal connector 104 can mate to the notebook 102 at a second thermal connector 106 built into a housing 108 of the notebook 102. The connection of the first thermal connector 104 with the second thermal connector 106 may be maintained with a slight interference fit or with other types of mechanical attachment such as fasteners. The second thermal connector 106 can be positioned close to a first end 110 of a heat pipe 109 that exists within the notebook 102. An opposite end 112 of the heat pipe 108 can be attached to a CPU package 114 so as to conduct heat away from a CPU 116 toward the first thermal connector 104 when the module 100 is attached. The module 100 contains a cooling device (discussed below) that, when connected to the notebook 102, is designed to aid in the transport of heat away from the CPU 116 positioned within the notebook 102.

Figures 2A, 2C:
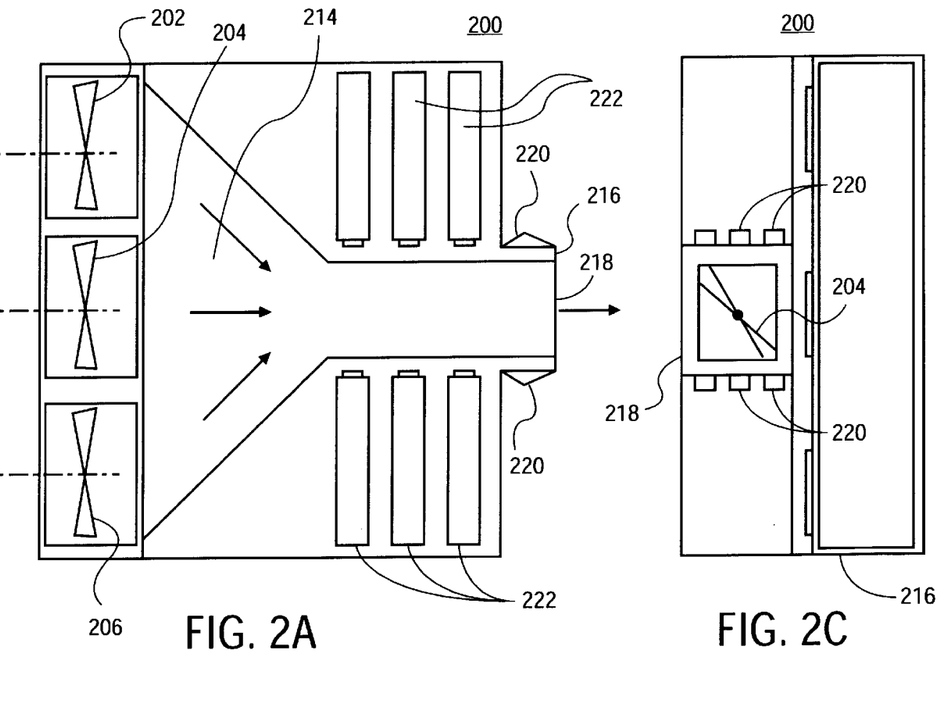
FIG. 2A is an illustration of a cross-section of the portable module having three fans.
FIG. 2C is an illustration of an opposite end-view of the portable module with three fans.
Figure 2B:
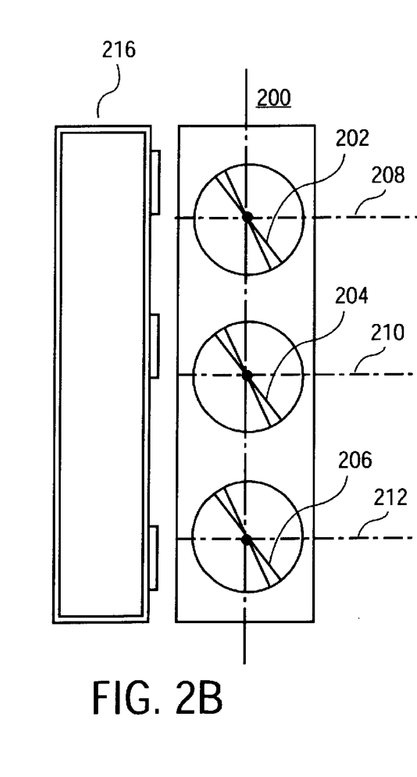
FIG. 2B is an illustration of an end-view of the portable module having three fans.

Illustrated in FIGS. 2A–C is an embodiment of the portable module 200 containing a cooling device in the form of three fans 202, 204, 206. The fan axes 208, 210, 212 can be positioned to be in-line with the plane of the desired flow direction 214. A screened door 216 may be provided to restrict access to the fans 208, 210, 212 yet still allow outside air access to the fans 208, 210, 212 when the fans 208, 210, 212 are operating. When operating, airflow from the fans 208, 210, 212 can be combined first in a funnel area 214 and then directed out of the module 200 through the first thermal connector 218. Six metal fasteners 220, each in the shape of a "V", are attached to the first thermal connector 218 and provide a flexible interference fit when mated with a computer (not shown). Power for the fans 208, 210, 212 can be supplied by a number of 1.5 volt batteries 222 that can be housed within the module 200.

Figure 3:
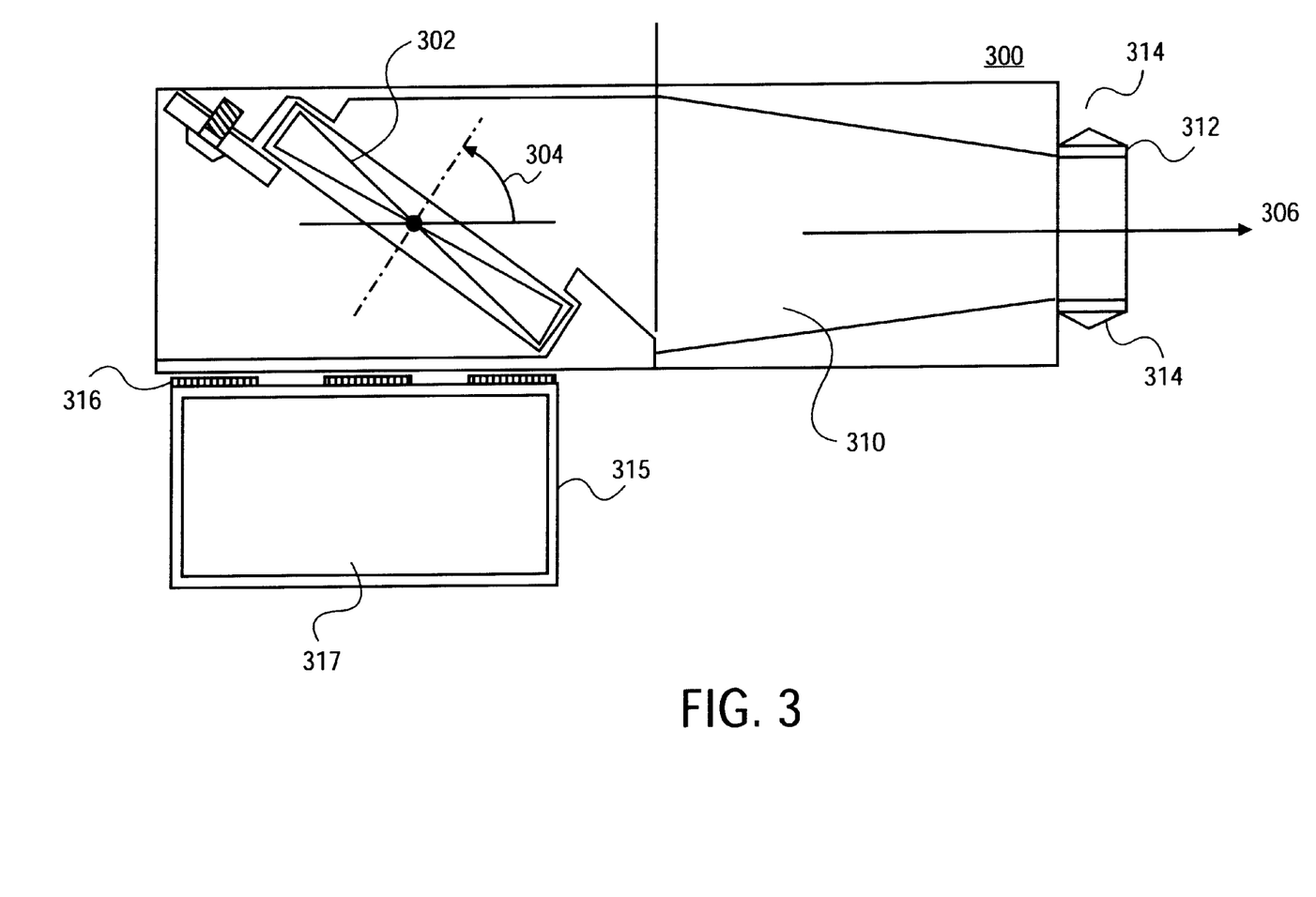
FIG. 3 is an illustration of the portable module having a single fan.

FIG. 3 illustrates an end view of an alternate embodiment for a portable module 300, where a single fan 302 is used as the cooling device and placed within the module 300 at an angle 304 to the desired flow direction 306. As with the previous embodiment (FIGS. 2A–C), a screened door 308 may be provided to allow the fan 302 access to outside air. Airflow could be directed into a funnel area 310 by the fan 302 to then flow through the first connector 312. The first connector 312 could be attached to a computer (not shown) using flexible "V" shaped interference fasteners 314. A screened door 315 can pivot on hinges 316 so as to open or snap shut. An advantage of the pivoting door 314 is to allow for access to the fan 302 and for cleaning of the screen 316.

Figure 4:
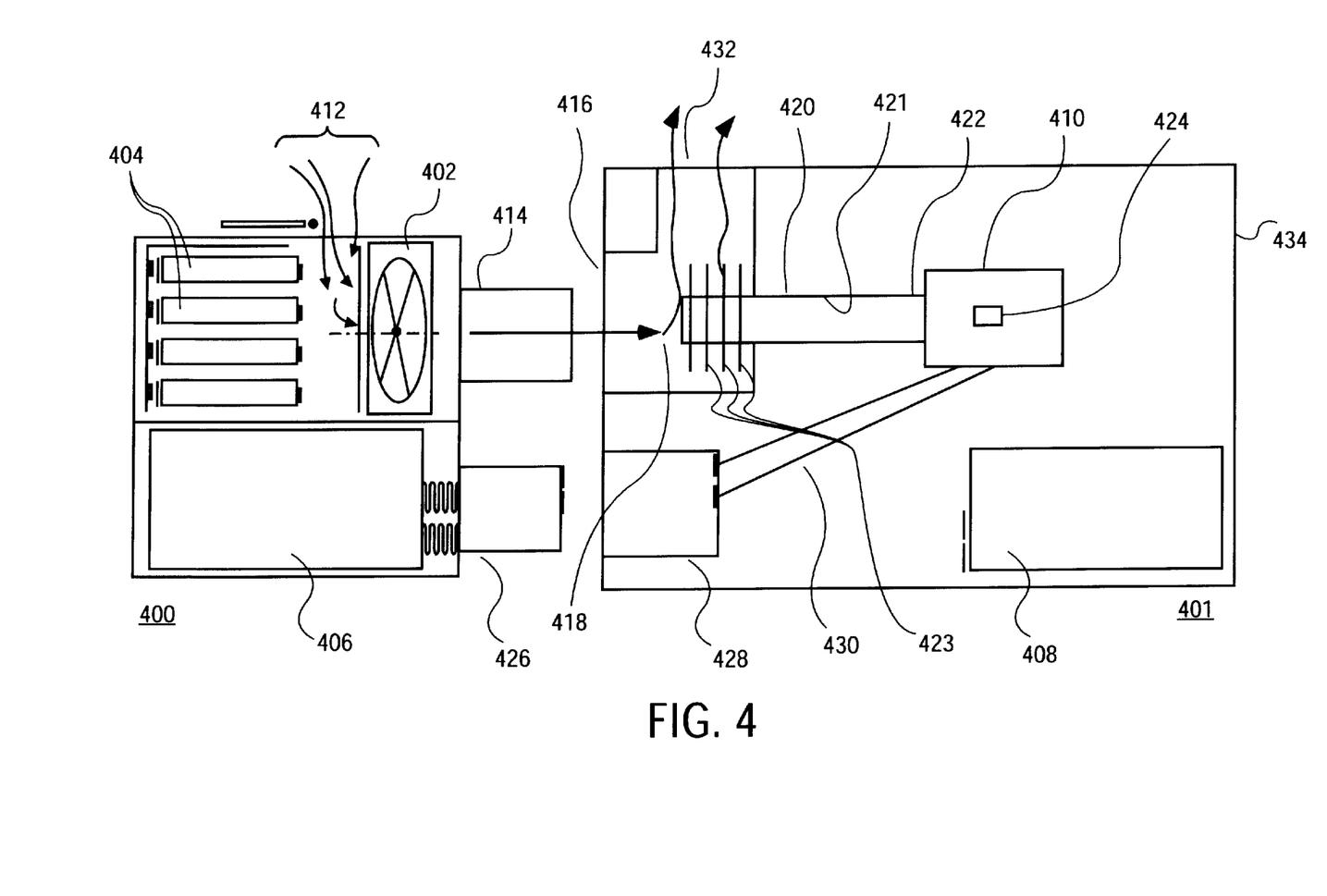
FIG. 4 is an illustration of the portable module containing a computer battery beside the notebook computer.

FIG. 4 illustrates another embodiment of a portable module 400. This embodiment retains the use of an angled fan 402 as the cooling device within. The fan 402 is powered by a number of batteries 404 such as standard 1.5 volt batteries. In addition, a rechargeable battery is placed within the module 400 that can supply power to the computer 401. This module battery 406 can be the same type and size of battery as a computer battery 408 used to power the computer 401. With this embodiment, a first connector 414 of the portable module 400 could provide supplementary cooling to the CPU package 410 of the computer 401 and a second connector 426 could provide additional power to run the computer 401. The fan 402 operates to direct a flow of air that is drawn in from outside 412 the module 400 and directed through a first thermal connector 414 of the module 400 and through a second thermal connector 416 of the computer 402. The airflow is then incident 418 to an end 420 of a heat pipe 421 having a number of fins 423. The heat pipe 421 has the opposite end 422 attached to a CPU package 410 to pull heat away from the CPU 424. The airflow, after flowing through the area of the heat pipe end 420, may be vented through a vent port 432 in the computer case 434.

The module battery 406 within the module 400 can connect to a first electrical connector 426 of the module 400. The first electrical connector 426 can connect to a second electrical connector 428 of the computer 401. A set of electrical cable 430 can run from the second electrical connector 428 to intercept computer circuitry (not shown) at a point desired to add the module battery 406. A switch (not shown) can shut off the power supply from the computer battery 408 when the module battery 406 is in use, or the switch can place the module battery 406 in series with the computer battery 408.

Figure 5:
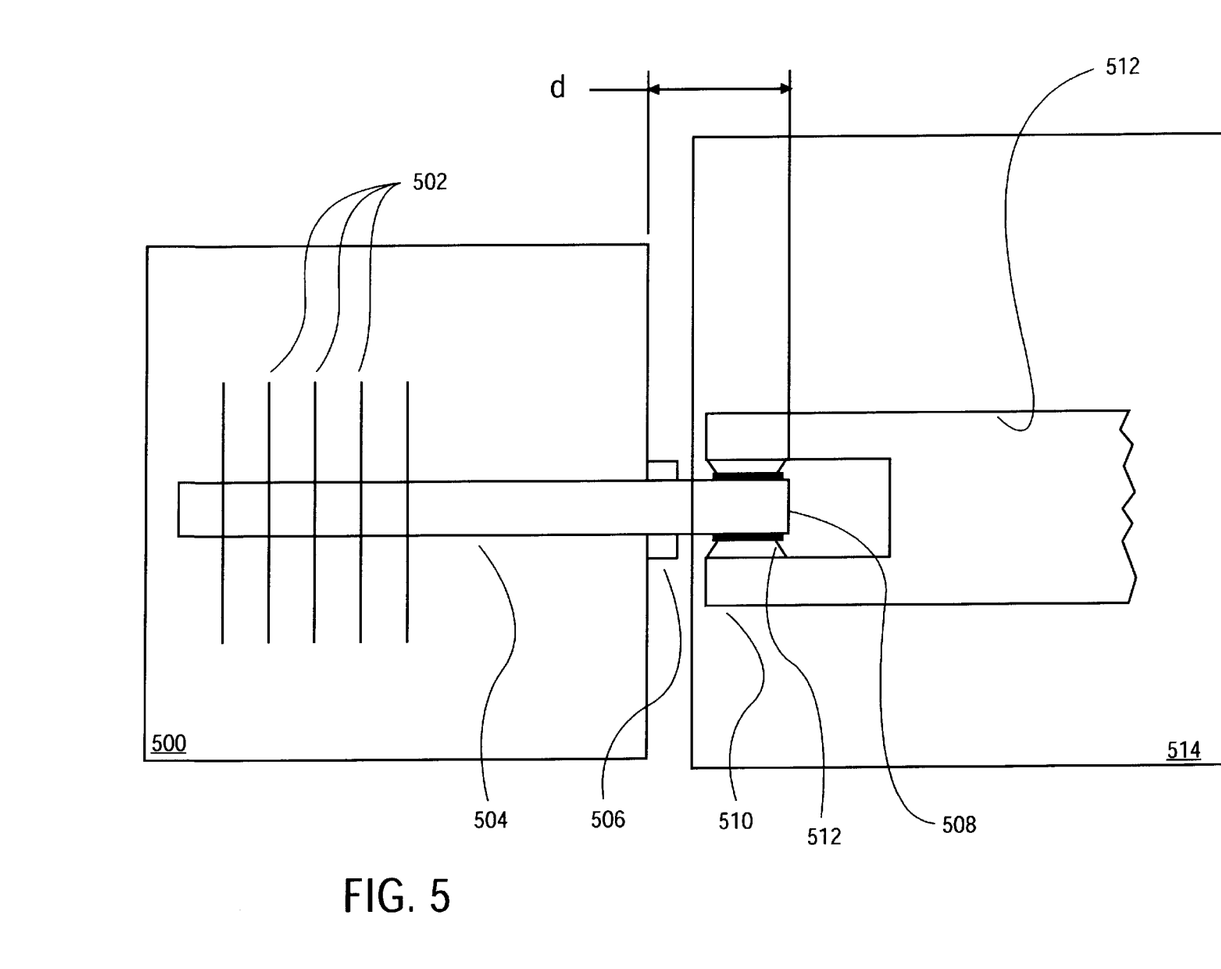
FIG. 5 is an illustration of the portable module with cooling fins.

FIG. 5 illustrates an embodiment where the cooling device within the portable module 500 is a series of fins 502 that act as a heat sink and carry off heat by convection. In this embodiment, a number of fins 502 are attached to a core 504 of heat conducting material such as copper or heat pipes. The core 504 then runs to the first thermal connector 506 where it extends out 508 of the portable module 500 a distance d. The core extension 508 contacts an end 510 of the computer heat pipe 512. In an embodiment, the connection can be accomplished with bands 512 of a flexible heat conducting material such as copper that are attached to the computer heat pipe 512. This connection allows for heat conduction from the heat pipe end 510 toward the fins 502 where heat can be convected to atmosphere.

Figure 6:
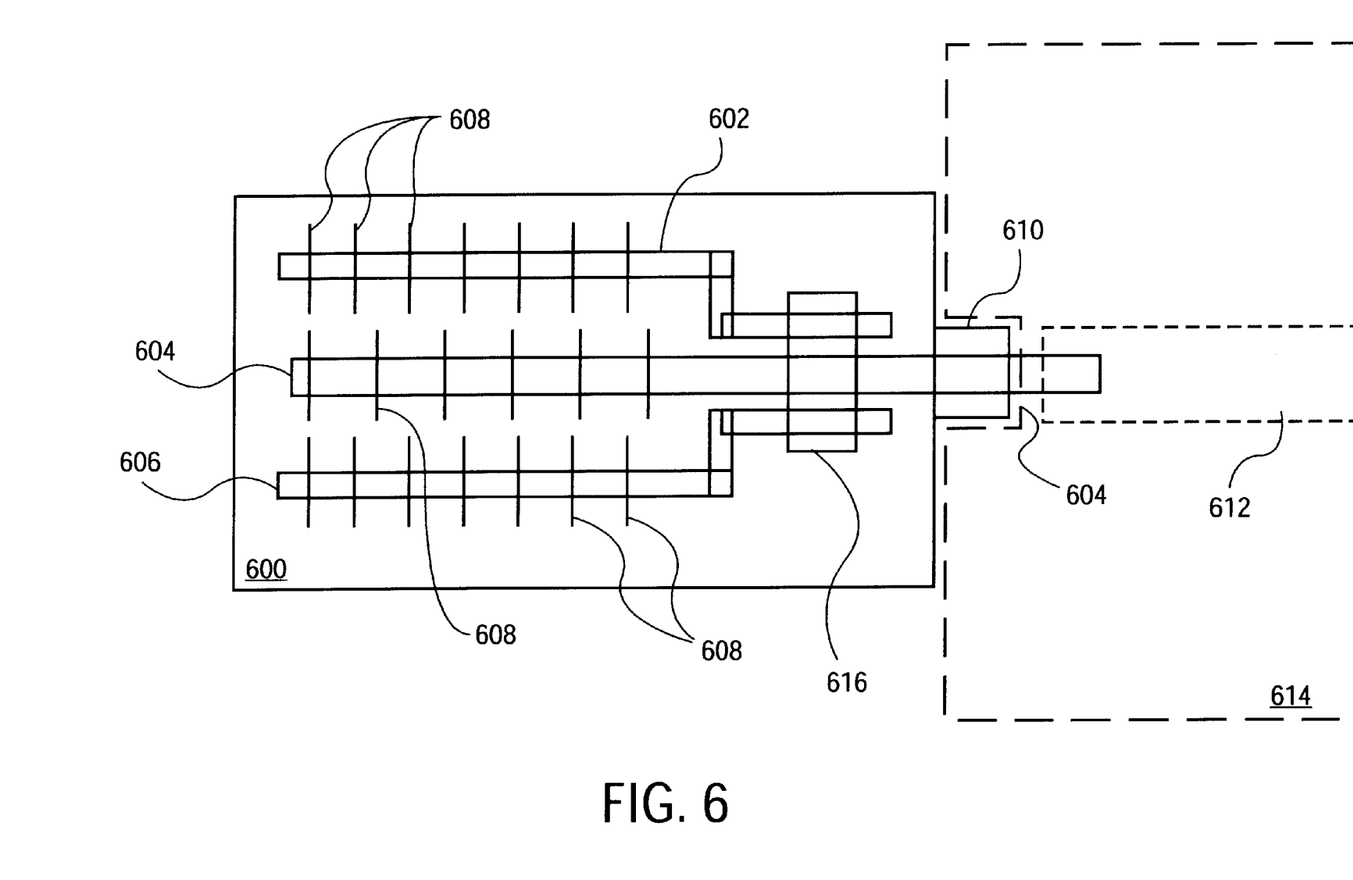
FIG. 6 is an illustration of the portable module containing several heat pipes.

FIG. 6 illustrates an embodiment where a number of heat pipes 602, 604, and 606 are linked within the portable module 600. Attached to each of the heat pipes 602, 604, and 606 are a number of cooling fins 608. Heat pipe 604 is a module core heat pipe that passes through the first thermal connector 610 of the module 600 and contacts a heat-conducting device such as a heat pipe 612 within the computer 614. By direct contact, heat will transfer from the computer heat pipe 612 to the module core heat pipe 604. The module core heat pipe 604 can conduct heat to each of the adjacent heat pipes 602, and 606 through a block connector 616 made of heat conducting material such as copper. Attached to ends of each heat pipe 602, 604, and 606 can be the cooling fins 608 where the heat conducted from the computer 614 can be convected to atmosphere.

Figure 7:
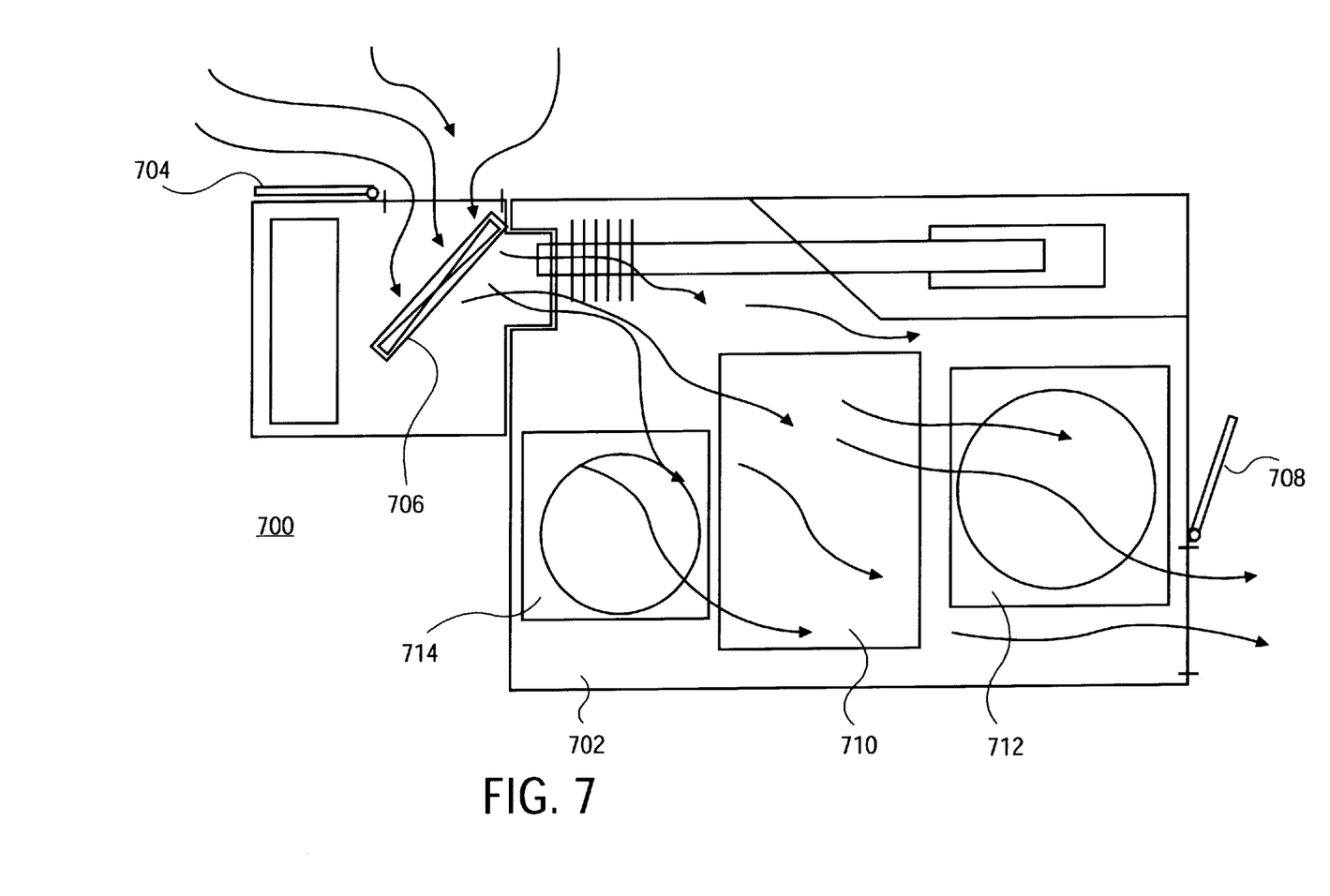
FIG. 7 is an illustration of airflow from the portable module over components within the computer.

FIG. 7 illustrates an embodiment where a door 704 of a portable module 700 allows atmosphere to flow into the module 700. The airflow is then directed with the fan 706 into the computer 702 interior. The computer 702 has a door 708 that can be opened to allow the air flowing from the module 700 to be vented. As a result of the fan 706 operation, air flows over all components (except a portion of computer heat pipe and the CPU package/CPU for proper function of the heat pipe) within the computer that generate heat. Such components could include the hard drive 710, a DVD or CD-ROM drive 712, floppy drive 714, etc.

Figure 8A:
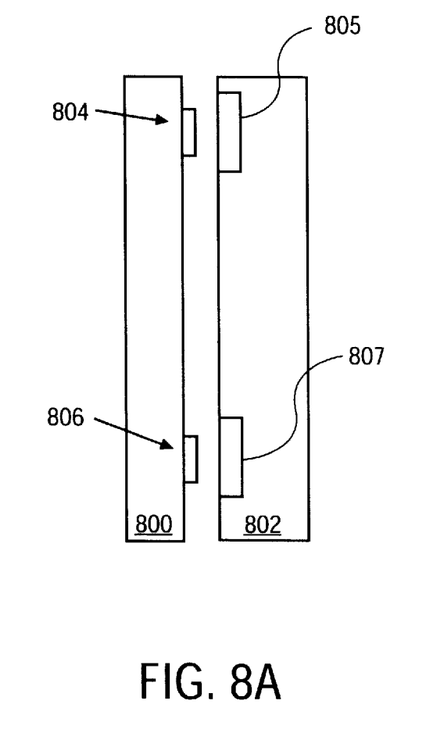
FIG. 8A is an illustration of the portable module with a handheld device.
Figure 8B:
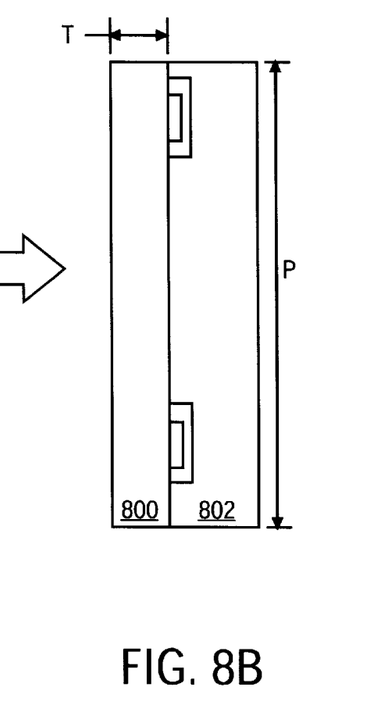
FIG. 8B is an illustration of the portable module connected to the handheld device.

FIGS. 8A & B illustrate a thermal and power management solution for a handheld device 802. The portable module 800 could have a profile P that matches that of the handheld device 802, adding only an extra thickness T to the overall shape when connected. The portable module 800 could contain the same types of interface connectors, i.e. the thermal connector 804 and electrical connector 806, the handheld device the same thermal connector 805 and electrical connector 807 as used for the notebook design.

Figure 9:
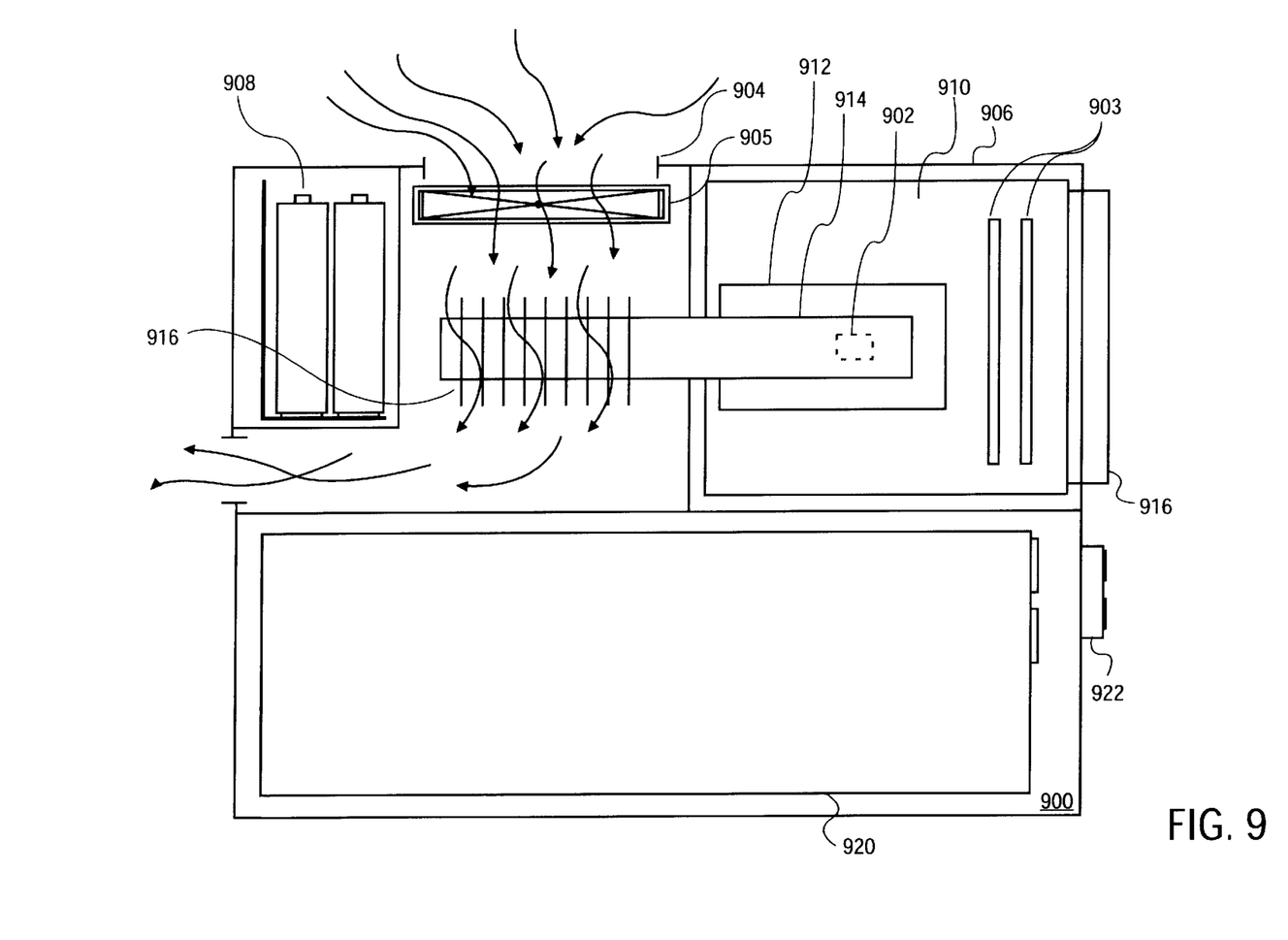
FIG. 9 is an illustration of the portable module having an on-board CPU and memory.

FIG. 9 illustrates an embodiment of a portable module 900 having a CPU 902 and memory on-board 903. When the module 900 is connected to a computer system such as a notebook or handheld device (not shown), the module CPU (second CPU) will replace (swap) the notebook or handheld device CPU (first CPU) (not shown). The module 900 contains a fan 905 that pulls air in from atmosphere through a first opening 904 in the module housing 906. The fan 905 can be powered by on-board batteries 908 such as a type providing 1.5 volt output. Within the module 900 is a printed circuit board 910 which has a CPU package 912 connected. Contacting the CPU package 912 is a heat pipe 914 having fins 916 on one end that are positioned to receive airflow from the fan 905. After air has passed around the fins 916, the air is directed out of the module through a second opening 918. Located on the printed circuit board 910 are one or more RAM memory cards 903 to support the on-board CPU 902. The printed circuit board 910 connects to a slot 916 on the side of the module 900. The slot 916 will connect to a notebook or handheld device (not shown) thereby electrically connecting the printed circuit board 910 in the module 900 to the circuitry of a notebook (not shown). Once connected, the on-board CPU 902 will function as the CPU 902 for the notebook or handheld device and the notebook CPU from the notebook system will be shunted from the system. The RAM on-board 903 the module 900 may supplement or supplant RAM that exists on the notebook motherboard (not shown). An embodiment may also provide an additional battery 920 to support power needs of the notebook or handheld device. The on-board battery 920 can connect to an electrical connector 922 on the side of the module 900. The electrical connector 922 can then connect to a mating electrical connector on the notebook or handheld device (not shown).

In this manner, it is possible to upgrade the processing capability and the power needs of a notebook or handheld device. Circuitry on the notebook or handheld device motherboard (or motherboard equivalent) would have to be designed to accept these "CPU-swap" and "memory add" features from the portable module. Along with swapping the CPU, the portable module could provide additional memory to add to memory presently on the notebook motherboard. The portable module could provide memory that replaces the existing memory on the notebook motherboard. Alternatively, the portable module may be used to add additional memory to the memory existing on the notebook or handheld device without swapping the CPU.

In an embodiment of the portable module, any combination of fans, heat pipe, and cooling fins are possible. It could be designed within the module to have a large number of small heat pipes, each with a large number of cooling fins where one or more fans could flow air over the cooling fins and/or heat pipes. The number, shape, and placement of components of heat pipes, an/or fins, and/or fans could be determined through design by one skilled in the art to meet thermal management requirements for operating a particular notebook or handheld device.

In a variety of embodiments, the portable module may use standard 1.5 volt batteries to power one or more fans to supplement cooling to a notebook or a handheld device however any combination of battery types could be considered to meet power requirements. Alternatively, the fans may draw their power from the same battery that provides power to the notebook or handheld device and would not require a separate battery supply.

Additionally, the module can carry a battery designed to provide additional power to a notebook or handheld device. This computer battery could be of the same type as used in the computer or a more compact version. The portable module may also function to provide supplemental cooling without containing an additional computer battery for the notebook or handheld device. The portable module may have a cord and transformer feature that allows for an AC connection to run the fans and/or provide power to the notebook or handheld device.

We claim:

1. An apparatus, comprising:
   a portable computer having a first CPU;
   a portable module the portable module including a second CPU;
   means to connect the portable module to the portable computer;
   means for the portable module to transfer heat from the portable computer; and
   means for shunting the first CPU from the portable computer such that the second CPU functions as the CPU for the portable computer when the portable module is connected to the portable computer.

2. The apparatus of claim 1, further comprising: means for the portable module to provide power to the portable computer.

3. The apparatus of claim 1, further comprising one or more memory boards on the portable module such that when connected to the portable computer the memory adds to the available processing memory.

4. The apparatus of claim 1, further comprising:
   RAM memory cards installed within the portable module such that when the portable module is connected to the portable computer system, the RAM memory cards add to the portable computer system memory.

5. The apparatus of claim 1, further comprising: RAM memory cards installed within the portable module such that when the portable module is connected to the portable computer system, the RAM memory cards replace the portable computer system memory.

6. The apparatus of claim 1, wherein the portable module further comprises one or more fans that provide cooling for the second CPU.

* * * * *